(12) United States Patent
Vieira

(10) Patent No.: US 8,755,985 B2
(45) Date of Patent: Jun. 17, 2014

(54) METHOD AND A DEVICE FOR MONITORING AN ENGINE

(71) Applicant: EUROCOPTER, Cedex (FR)

(72) Inventor: Hilario Vieira, Berre L'Etang (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/760,403

(22) Filed: Feb. 6, 2013

(65) Prior Publication Data

US 2013/0204507 A1    Aug. 8, 2013

(30) Foreign Application Priority Data

Feb. 8, 2012    (FR) ...................... 12 00377

(51) Int. Cl.
*G06F 17/00*    (2006.01)
(52) U.S. Cl.
USPC ........ 701/100; 701/29.4; 701/31.4; 701/31.9; 701/32.1
(58) Field of Classification Search
USPC .............. 701/3, 4, 14, 9, 99, 100, 29.1, 29.4, 701/29.6, 30.9, 31.4, 31.9, 32.1
See application file for complete search history.

(56) References Cited

U.S. PATENT DOCUMENTS

| | | | |
|---|---|---|---|
| 4,280,060 A | 7/1981 | Kure-Jensen | |
| 7,596,428 B2 | 9/2009 | Potdar | |
| 7,617,029 B2 | 11/2009 | Loda | |
| 7,712,376 B2 | 5/2010 | Bode | |
| 7,822,577 B2 | 10/2010 | Sathyanarayana | |
| 8,050,842 B2 | 11/2011 | Iraudo | |
| 2005/0016176 A1* | 1/2005 | Griffiths et al. ................. | 60/734 |
| 2008/0249828 A1 | 10/2008 | MacAuley | |
| 2011/0106551 A1 | 5/2011 | Durand | |

FOREIGN PATENT DOCUMENTS

| | | |
|---|---|---|
| DE | 102008015588 A1 | 10/2008 |
| EP | 1653050 A1 | 5/2006 |
| EP | 2006202 A1 | 12/2008 |
| FR | 2920056 A1 | 2/2009 |
| JP | 3100304 A | 4/1991 |
| JP | 7217407 A | 8/1995 |

OTHER PUBLICATIONS

Search Report and Written Opinion; Application No. FR 1200377; dated Oct. 29, 2012.

* cited by examiner

*Primary Examiner* — Richard Camby

(74) *Attorney, Agent, or Firm* — Brooks Kushman P.C.

(57) ABSTRACT

A method of monitoring at least one limited-lifetime part. During an identification step (STP1), storage means (40) store a list including a reference for each limited-lifetime part of an engine (3). During an information-search step (STP2), the storage means (40) communicate with a centralized data system (DB) in order to store for each identified part the corresponding maintenance data. During a monitoring step (STP3), the wear of the engine is monitored by using the information stored in the storage means (40).

18 Claims, 1 Drawing Sheet

METHOD AND A DEVICE FOR MONITORING AN ENGINE

CROSS REFERENCE TO RELATED APPLICATIONS

The present application claims priority to French patent application No. FR 12/00377 filed on Feb. 8, 2012, the content of which is incorporated in its entirety by reference herein.

BACKGROUND OF THE INVENTION

Field of the Invention

The present invention relates to a method of monitoring an engine, and also to the associated device.

More particularly, the invention lies in the technical field of maintaining an engine of an aircraft, and in particular of a rotary-wing aircraft.

Conventionally, a rotary-wing aircraft has a main rotor providing the aircraft with lift and possibly also with propulsion. The main rotor is driven in rotation by at least one engine.

For example, at least one turboshaft engine drives a main power transmission gearbox (MGB), and the MGB drives the main rotor in rotation.

Each engine is then controlled by a respective engine computer that possibly co-operates with an avionics computer.

A turboshaft engine thus serves to drive a main rotor of a rotary-wing aircraft. Nevertheless, each engine usually includes parts that are of limited lifetime.

It is therefore appropriate to monitor those limited-lifetime parts in order to replace them or to repair them at the times specified by the manufacturer.

Usually, a limited-lifetime part is monitored by means of at least one ageing parameter and by means of at least one maximum threshold for said ageing parameter.

An operator fills in a document referred to as the "registration sheet" ("fiche matricule" in French language) in order to mark the current value of each ageing parameter for a limited-lifetime part.

When an ageing parameter of a part reaches or comes close to the maximum threshold set by the manufacturer, a maintenance action is undertaken in order to repair or replace the part, for example.

Such an ageing parameter may be the number of flying hours performed by the limited-lifetime parts, for example. In the context of a rotary part such as a free turbine of a turbine engine, another ageing parameter may be the number of revolutions performed by the turbine rotor about its own axis of rotation.

In general manner, it is common practice to define a number of wear cycles in order to harmonize the units with which lifetime is measured between the various parts being monitored.

Depending on the utilization conditions of the aircraft, one hour of flying then gives rise to a certain number of wear cycles that may vary from one limited-lifetime part to another.

In a first known technique, the computer of a turbine engine communicates with sensors monitoring the engine.

For each limited-lifetime part, the engine computer determines an ageing parameter relating to the lifetime of that part.

For example, the engine computer may use relationships that are defined by the manufacturer in order to determine the number of wear cycles have had been consumed by an engine part during a flight. At the end of the flight, such a part has then been subjected to a total number of wear cycles equal to the sum of the number of wear cycles to which it had already been subjected before the flight plus the number of wear cycles consumed during the flight.

For convenience, such a number of wear cycles consumed during a flight is referred to as a "consumed wear cycle".

The engine computer then transmits the determined ageing parameter to display means of the aircraft, e.g., for each part, its total number of wear cycles and its number of consumed wear cycles.

A pilot can then read the value of the ageing parameter of a limited-lifetime part. The pilot can confirm the value on the basis of estimates set out in the flight manual.

In addition, the pilot or a maintenance operator writes the new value for the ageing parameter of each limited-lifetime part in the corresponding registration sheet.

In a second known technique, monitoring is performed by an avionics computer and not by the engine computer.

Both of those techniques thus imply that the pilot is involved in the monitoring of the engines of an aircraft.

In the technological background remote from the invention, the following documents are known in particular: U.S. Pat. No. 7,617,029, US 2008/0249828, and US 2011/0106551.

Document U.S. Pat. No. 7,617,029 describes a system for managing the issuing of a fault code signal.

That system includes a monitoring member communicating with equipment such as an engine for the purpose of monitoring parameters of the equipment. Furthermore, that monitoring member communicates with remote electronic equipment via a wireless connection in order to transmit fault code signals.

That system can generate artificial fault code signals for training purposes.

Document US 2008/0249828 presents a system having a control unit in communication with archives, a client, a maintenance center, and a repair unit.

The control unit has access to a database stored in said archives.

The control unit generates a maintenance plan by using the database, and maintenance instructions are generated. Under such circumstances, the control unit communicates a logical order to the maintenance center in order to inspect the equipment, the order being based on said maintenance instructions.

Document US 2011/0106551 describes a method of tracking an engine. In that method, a signal is received that represents the location of a log book of the engine, and the signal is used to determine the location of the engine, after which the location of the engine is stored in memory.

Document FR 2 920 056 A1 describes a device for estimating an expected lifetime on the basis of probabilistic planning.

For that purpose, operational terrain data is analyzed to identify trends. Utilization plans are thus obtained by making use of the terrain data and of operating data on the basis of a representative sample of the turbine engines.

Thereafter, a computer program on a data medium is implemented in a system including a server assembly, and client systems connected to the server assembly. The server assembly includes a database server, a database, an application server, an internal server, a fax server, a directory server, and a mail server.

That document FR 2 920 056 A1 thus proposes a probabilistic method and a device that is not on board for the purpose of determining a lifetime while designing an engine and not for continuously monitoring an engine.

Document DE 10 2008 015588 A1 relates to methods and devices for controlling valves in a steam turbine.

In that method, fundamental characteristics of multiple modes of operation of the valves are determined, and then the behavior of the valves is monitored.

Under such circumstances, the behavior of the valves is compared with the fundamental characteristics in order to identify the stresses exerted on the valves for the purpose of predicting valve wear.

The following documents are also known:

Documents JP 7 217407 A and JP 3 100304 A.

Document U.S. Pat. No. 4,280,060 A describes a device for controlling a gas turbine generator.

Document EP 2 006 202 A1 describes a turbine engine co-operating with an electronic computer that controls warning means.

Document EP 1 653 050 A1 describes a method of determining approximately the value of a parameter representative of the fatigue of a component.

BRIEF SUMMARY OF THE INVENTION

An object of the present invention is thus to provide a method of monitoring an engine having limited-lifetime parts, the method seeking at least to minimize the involvement of a pilot in the monitoring.

The invention implements a method of monitoring a vehicle engine having at least one part of limited lifetime, each part being associated with an ageing parameter and with a lifetime threshold. For example, the ageing parameter is a number of wear cycles.

Once said engine is started, the following steps are performed:

during an identification step, temporary storage means of the vehicle stores a list including a reference for each identified limited-lifetime part of said engine;

during an information-search step, the storage means communicate with a centralized data system remote from the vehicle and storing maintenance data including at least for each reference of a limited-lifetime part from the manufacturer a value of the ageing parameter prior to starting, the storage means storing the corresponding maintenance data for each identified limited-lifetime part; and during a monitoring step, engine wear is monitored by using the information stored in said storage means.

Consequently, on starting the engine, storage means load a list of limited-lifetime parts of that engine.

The storage means also download maintenance data for the identified parts from a centralized data system.

At this stage, the storage means contain the maintenance data that is conventionally to be found on registration sheets.

Under such circumstances, the method makes it possible to facilitate maintenance by serving to list the limited-lifetime parts and to associate each limited-lifetime part with appropriate maintenance data.

The method may also include one or more of the following additional characteristics.

For example, during the monitoring step:

a calculation system calculates a current value of the ageing parameter for each limited-lifetime part of the engine by taking into consideration the value before starting and a consumption value of said ageing parameter that is determined for each part, such as a number of consumed wear cycles as calculated for each part;

the calculation system stores the current value of the ageing parameter for each limited-lifetime part in the storage means; and the storage means update the centralized data system, with the value before starting of each ageing parameter for each limited-lifetime part becoming equal to said corresponding current value.

Under such circumstances, the calculation system performs stored operations in order to update the maintenance data as time progresses.

In particular, the calculation system determines a consumed value representing the consumption of each ageing parameter since the engine was started in order to deduce therefrom a total current value of the ageing parameter for each limited-lifetime part being monitored. The term "consumed value" is thus used to mean the increase in the value of an ageing parameter during a period of operation going from starting the engine to stopping it.

This current value is thus higher than the value stored in the storage means at the beginning of operation of the engine.

Under such circumstances, the calculation system communicates with the storage means to update the maintenance data.

Thereafter, the centralized data system is automatically updated on the basis of the information stored in the storage means. The storage means may be emptied at the end of the process.

It can thus be seen that a pilot no longer needs to be involved in monitoring the lifetimes of limited-lifetime parts. The pilot's workload is thus minimized.

In another aspect, the storage means may communicate via a wireless connection with said engine to store said list of identified limited-lifetime parts.

Thus, each limited-lifetime part may include a radio-tag storing its reference. The storage means then performs a radio-tag reading function in order to establish the list of parts to be monitored.

The technique known under the acronym RFID for "radio-frequency identification" may thus be used.

It is also possible to use identification plates in order to establish said list.

Furthermore, the storage means may communicate directly with the centralized system via the Internet data network, for example.

In a variant, the storage means communicate with a centralized data system via communications means of the vehicle. By way of example, the communications means may comprise an avionics computer and an antenna.

In order to update the centralized data system, the avionics computer takes data from the storage means and transfers the data it acquires to the centralized system.

Furthermore, the maintenance data includes a maximum threshold for the ageing parameter of each limited-lifetime part in the centralized data system. This maximum threshold corresponds to the lifetime of each limited-lifetime part.

In a first implementation, the calculation system triggers a warning when the maximum threshold is reached.

In a second implementation that may be performed on its own or in addition to the first implementation, an operator may determine a maintenance threshold for each identified limited-lifetime part.

The calculation system triggers an alert when the maintenance threshold is reached.

In a first variant of the second implementation, the operator thus inputs the maintenance threshold directly, e.g. as some number of wear cycles.

In a second variant of the second implementation that may be performed in parallel with the first variant, in order to determine the maintenance threshold the operator inputs a number of operating periods to be performed before exhausting the lifetime of a part, each operating period extending from starting an engine to stopping it.

For example, in the context of an aircraft, the operator sets a number of flights to be performed before exhausting the ageing parameter of at least one part. For example, an operator going to a platform at sea may input two flights in order to be certain to be able to go to the platform and to return therefrom.

The calculation system then determines an operating margin, with the operating margin being equal to the product of the mean value of the ageing parameter per operating period multiplied by the number of operating periods to be performed before being exhausted.

The maintenance threshold is then equal to the difference between the maximum threshold and the operating margin.

Independently of the implementation, the calculation system may thus compare the current value of an ageing parameter with a threshold, and trigger a warning if the threshold is reached.

Furthermore, it is possible, on request, to display at least some of the information stored in the storage means in order to enable an operator to take cognizance of the information. Instead of consulting the registration sheet, action is thus taken on signaling means.

In another aspect, the calculation system transmits the current value of the ageing parameter of each limited-lifetime part to the storage means at a sampling periodicity defined by the manufacturer.

For example, the storage means may be updated every minute.

In a variant, the calculation system sends the current value of the ageing parameter of each limited-lifetime part to the storage means only when the engine is stopped.

Since the engine is mounted on an aircraft, the maintenance data includes, for each limited-lifetime part, a value of the ageing parameter prior to starting, a maximum threshold for the ageing parameter, and a per-flight mean value of the ageing parameter.

The per-flight mean value is updated when the engine is switched off.

In addition to a method, the invention also provides a monitoring device for monitoring an engine of an aircraft, the device comprising a calculation system communicating with at least one measurement means relating to a current value of an ageing parameter of at least one limited-lifetime part of said engine.

In order to perform the above-explained method, the device includes a centralized data system remote from the vehicle for storing maintenance data, the device having storage means present in said vehicle that communicate with said engine in order to identify the limited-lifetime parts of the engine and that communicate with said centralized data system in order to store the maintenance data relating to the limited-lifetime parts of said engine.

Optionally, the calculation system executes instructions to calculate a current value of an ageing parameter of each limited-lifetime part of the engine and to store said current value of the ageing parameter of each limited-lifetime part in the storage means, said storage means updating said centralized data system.

The device may also include one or more of the following characteristics.

The device may include at least one identification means for identifying the limited-lifetime parts of the engine and communicating with the storage means. The identification means may comprise radio-tags.

In addition, the device may include communications means associated with the storage means and with the centralized data system.

The calculation system may comprise an engine computer of the FADEC type, and the communications means may comprise an avionics computer and an antenna.

In another aspect, the device is optionally provided with means for inputting a maintenance threshold, the input means co-operating with said calculation system.

The device optionally includes warning means connected to the calculation system to trigger a warning if a threshold is reached, i.e. the maintenance threshold or the maximum threshold.

The device optionally includes signaling means for displaying, on request, at least some of the information stored in the storage means.

Finally, the invention provides an aircraft provided with an engine, the aircraft having a monitoring device as described above.

BRIEF DESCRIPTION OF THE SEVERAL VIEWS OF THE DRAWINGS

The invention and its advantages appear in greater detail in the context of the following description of implementations given by way of illustration with reference to the accompanying figures, in which.

DETAILED DESCRIPTION OF THE INVENTION

Elements present in more than one of the figures are given the same references in each of them.

Figure 1:
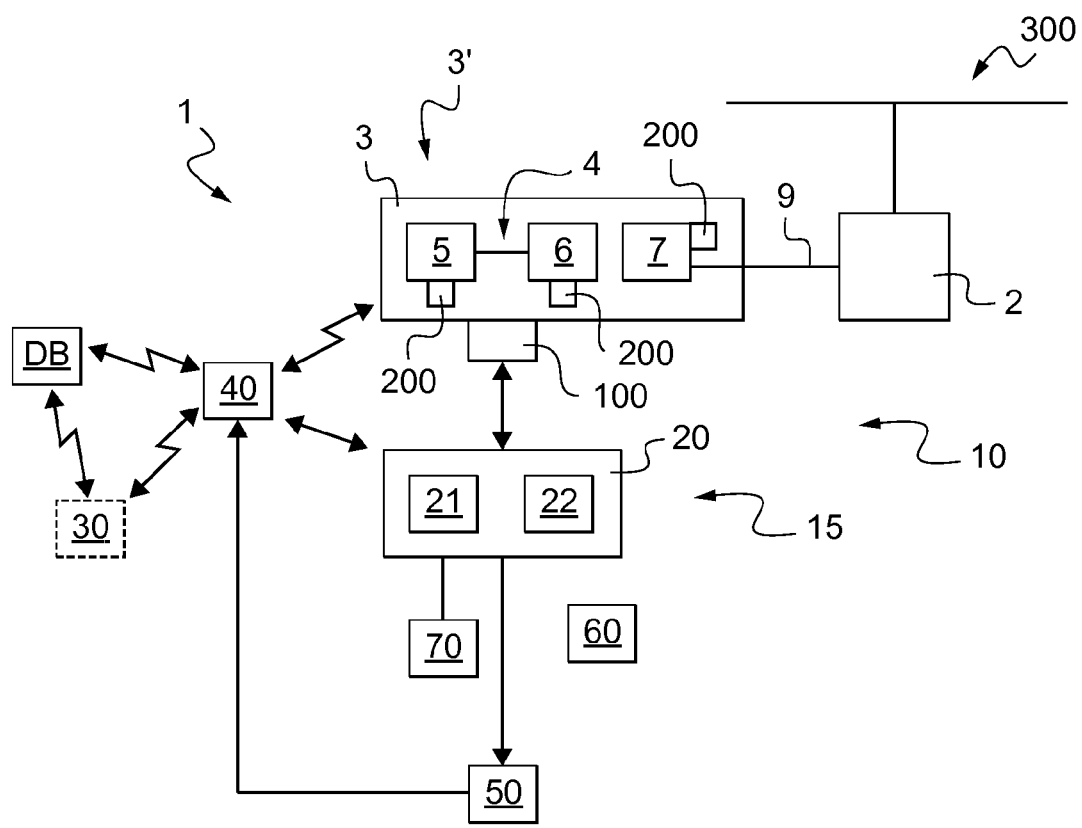
FIG. 1 is a diagram of an aircraft.

FIG. 1 shows an aircraft 1 having a rotary wing 300.

The aircraft 1 has a power plant 3'. The power plant 3' includes at least one turbine engine 3 for driving the rotary wing 300 via a main power transmission gearbox (MGB) 2.

Each engine comprises a turboshaft engine having a gas generator 4 and a free turbine 7. For example, the gas generator comprises a compressor 5 co-operating with a high-pressure turbine 6 that is arranged upstream from the free turbine 7.

The free turbine 7 may then be connected to the main power transmission gearbox (MGB) 2 via a drive train 9. By way of example, the drive train 9 has an outlet shaft that is driven in rotation by the free turbine.

The aircraft 1 also includes a monitoring device 10 for monitoring those parts of an engine that have a limited lifetime, and more precisely for monitoring parts of the turbine engine 3. By way of example, the free turbine 7, the high-pressure turbine 6, and the compressor 5 are limited-lifetime parts.

The monitoring device 10 includes storage means 40 for storing maintenance data relating to the limited-lifetime parts of the engine 3.

The monitoring device 10 also includes at least one identification means 200 for identifying limited-lifetime parts of the engine.

Figure 2:
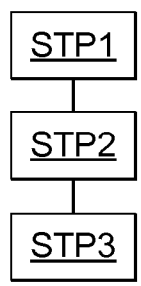
FIG. 2 is a diagram for explaining the method implemented.

With reference to FIG. 2, during an identification step STP1, the temporary storage means 40 store a list including a reference for each identified limited-lifetime part of the engine 3.

For example, the storage means 40 communicate via a wireless link with each identification means 200 of the engine 3 using the RFID method.

With reference to FIG. 1, the monitoring device 10 is also provided with a remote centralized data system DB outside the vehicle, e.g. on the premises of the engine manufacturer and/or of the aircraft manufacturer.

The centralized data system DB stores maintenance data including, at least for each reference of a limited-lifetime part of the manufacturer, a before-starting value of the ageing parameter, possibly a maximum threshold for the ageing parameter, and a per-flight mean value of this ageing parameter.

Such an ageing parameter is a number of wear cycles. Reference may be made to the literature to obtain information about this notion of wear cycles.

With reference to FIG. 2, during an information-search step STP2, the storage means 40 communicates with the centralized data system DB in order to obtain the maintenance data of the parts for monitoring.

For example, communications means 30 such as an avionics computer recovers the maintenance data from the centralized data system DB and transfers the maintenance data to the storage means.

Once the engine 3 has been started, a monitoring step STP3 is implemented to monitor the ageing of the engine while making use of the information stored in the storage means.

It is possible to use conventional methods.

Nevertheless, with reference to FIG. 1, the monitoring device 10 may optionally be provided for this purpose with a calculation system 15.

The calculation system comprises at least one calculation member that executes instructions stored in nonvolatile manner on a storage medium in order to perform the method.

For example, the calculation system 15 may comprise one engine computer 20 per turbine engine, such as a full authority digital engine control (FADEC) computer.

This engine computer 20 then has a calculation unit 21 and a memory unit 22 storing instructions that are executable by the calculation unit 21.

The calculation system co-operates with conventional measurement means 100 suitable for measuring the data values that relate to the ageing parameters in question.

Thus, with the help of the measurements made, the engine computer 20 of the calculation system 15 calculates consumption values for the amount by which these ageing parameters have been consumed since the engine was started. A consumption value may be a number of wear cycles consumed by each limited-lifetime part of the engine 3.

By summing the consumption value of the ageing parameter with its value before starting as transmitted by the centralized data system, the engine computer 20 of the calculation system 15 deduces the current value for the ageing parameter of each part.

The engine computer 20 of the calculation system 15 then stores this current value of the ageing parameter for each limited-lifetime part in the storage means 40.

Storage may be performed at a sampling periodicity defined by the manufacturer or else when the engine is stopped.

In parallel, the engine computer 20 of the calculation system 15 may update a per-flight mean value of the ageing parameter, with a flight beginning when the engine is started and ending when the engine 3 is stopped.

Thereafter, the storage means 40 update the centralized data system DB, with the value before starting of each ageing parameter of each limited-lifetime part then becoming equal to said corresponding current value. Likewise, the storage means update the per-flight mean value, where appropriate.

The storage means may comprise a processor executing instructions for this purpose.

Alternatively, an avionics computer may request updating automatically. On the order of the avionics computer, the storage means transmit the stored data to the centralized data system DB, either directly or else indirectly, e.g. via the avionics computer.

In another aspect, the monitoring device includes signaling means 50 for displaying, on request, at least some of the information stored in the storage means 40. The signaling means are then connected to the storage means, e.g. by a wired connection.

Furthermore, the device may optionally include warning means 70 connected to the calculation system 15 in order to trigger a warning if a maintenance action needs to be undertaken.

For example, when the current value of an ageing parameter reaches a trigger threshold, then a warning is triggered.

In a first implementation, the warning trigger threshold may be the maximum threshold.

Nevertheless, an operator may desire to benefit from a safety margin relative to the maximum threshold, e.g. in order to be certain to be able to accomplish a planned mission, such as a return flight to an airport.

Thus, the warning trigger threshold may be a maintenance threshold that is less than the maximum threshold, it being possible for this maintenance threshold to be determined directly or indirectly by an operator.

The device then has input means 60 connected by a wired or wireless connection to the calculation system 15.

An operator then uses the input means 60 to input data for use in establishing the maintenance threshold.

The calculation system 15 then acts for each part to determine whether the maintenance threshold has been reached, and where appropriate it generates a warning.

For example, the maintenance threshold may be input directly by the operator, with the operator inputting a number of wear cycles, for example.

Alternatively, the maintenance threshold is input indirectly via some number of operating periods input by the operator, e.g. a number of flights in the context of an aircraft.

For example, the operator may desire to issue a warning two flights before a maintenance action must be undertaken.

On the basis of the input number of operating periods and on the basis of a per-flight mean value for wear cycles for each limited-lifetime part, the calculation system deduces an operating margin for each part.

The warning is triggered when the current value of the ageing parameter of a part reaches a difference between the maximum threshold and the operating margin of that part.

Naturally, the present invention may be subjected to numerous variations as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A method of monitoring a vehicle engine having at least one part of limited-lifetime, each part being associated with an ageing parameter and a reference, wherein once said engine is started, the following steps are performed:

during an identification step (STP1), temporary storage means of the vehicle communicating with identification means associated with the at least one part of limited-lifetime of the engine to identify one or more of the at least one part and obtain the reference for each identified limited-lifetime part and storing a list including the reference for each identified limited-lifetime part of said engine;

during an information-search step (STP2), the storage means communicating with a centralized data system (DB) remote from the vehicle to obtain from the centralized data system maintenance data including at least for each reference of a limited-lifetime part a value of the ageing parameter prior to said engine being started, the storage means storing the corresponding maintenance data for each identified limited-lifetime part;

during a monitoring step (STP3), a calculation system of the vehicle monitoring engine wear using the maintenance data stored in said storage means, the calculation system calculating a current value of the ageing parameter for each identified part by taking into consideration said value of the ageing parameter prior to said engine being started and a consumption value of said ageing parameter that is determined for each part, said calculation system storing said current value of the ageing parameter for each identified part in the storage means; and during an updating step, after said engine is stopped, storage means updating said centralized data system (DB) with the current value of the ageing parameter for each identified limited-lifetime part.

2. A method according to claim 1, wherein said storage means communicate via a wireless connection with said identification means to store said list of identified limited-lifetime parts.

3. A method according to claim 1, wherein said storage means communicate with the centralized data system (DB) via communications means of said vehicle.

4. A method according to claim 1, wherein said ageing parameter is a number of wear cycles.

5. A method according to claim 1, wherein:
an operator determines a maintenance threshold for each identified limited-lifetime part; and
the calculation system triggers an alert when the maintenance threshold is reached.

6. A method according to claim 5, wherein in order to determine the maintenance threshold said operator inputs a number of operating periods to be performed before exhausting the lifetime of a part, each operating period extending from starting of an engine to stopping of the engine.

7. A method according to claim 1, wherein said maintenance data includes a maximum threshold for the ageing parameter of each identified limited-lifetime part in the centralized data system (DB), with the calculation system triggering a warning when the maximum threshold is reached.

8. A method according to claim 1, wherein in order to monitor the wear of the engine, the calculation system compares a current value of an ageing parameter with a threshold, and the calculation system triggers a warning when the threshold is reached.

9. A method according to claim 1, wherein, on request, at least some of the information stored in said storage means is displayed.

10. A method according to claim 1, wherein the calculation system transmits said current value of the ageing parameter of each identified limited-lifetime part to the storage means at a sampling periodicity defined by the manufacturer.

11. A method according to claim 1, wherein the calculation system transmits said current value of the ageing parameter of each identified limited-lifetime part to the storage means when the engine is stopped.

12. A method according to claim 1, wherein said vehicle is an aircraft, and said maintenance data includes, for each identified limited-lifetime part, a value of the ageing parameter prior to the engine being started, a maximum threshold for the ageing parameter, and a per-flight mean value of the ageing parameter.

13. A monitoring device for monitoring an engine of an aircraft, wherein the engine has at least one part of limited-lifetime and each part is associated with an ageing parameter and a reference, said device comprising:
identification means associated with the at least one part;
temporary storage means within the aircraft;
wherein the storage means is configured to upon the engine being started communicate with the identification means to identify one or more of the at least one part and obtain the reference for each identified part and to store a list including the reference for each identified limited-lifetime part of the engine;
wherein the storage means is further configured to communicate with a centralized data system remote from the aircraft to obtain from the centralized data system maintenance data including at least for each reference of a limited-lifetime part a value of the ageing parameter prior to said engine being started and to store the corresponding maintenance data for each identified limited-lifetime part; and
a calculation system within the aircraft configured to communicate with at least one measurement means relating to a current value of the ageing parameter of each identified limited-lifetime part of said engine, the calculation system further configured to calculate a current value of the ageing parameter for each identified part by taking into consideration said value of the ageing parameter prior to said engine being started and a consumption value of said ageing parameter that is determined for each part, said calculation system configured to store said current value of the ageing parameter for each identified part in the storage means;
wherein the storage means is further configured to upon the engine being stopped update said centralized data system (DB) with the current value of the ageing parameter for each identified limited-lifetime part.

14. A monitoring device according to claim 13, wherein said device includes communications means enabling communication between said storage means and said centralized data system (DB).

15. A monitoring device according to claim 13, wherein the device includes input means for inputting a maintenance threshold, the input means co-operating with said calculation system.

16. A monitoring device according to claim 13, wherein the device includes warning means connected to the calculation system for triggering a warning if a threshold is reached.

17. A monitoring device according to claim 13, wherein the device includes signaling means for displaying, on request, at least some of the information stored in said storage means.

18. An aircraft provided with an engine, wherein said aircraft includes a monitoring device according to claim 13.

* * * * *